US012443132B2

(12) United States Patent
Yasui et al.

(10) Patent No.: US 12,443,132 B2
(45) Date of Patent: Oct. 14, 2025

(54) FIXING UNIT

(71) Applicant: CANON KABUSHIKI KAISHA, Tokyo (JP)

(72) Inventors: Tatsuo Yasui, Saitama (JP); Junichi Moteki, Abiko (JP); Akiyoshi Shinagawa, Kasukabe (JP); Takuma Tadomi, Toride (JP); Ikuo Nakamoto, Matsudo (JP); Toru Katsumi, Toride (JP); Takahiro Ohnishi, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/661,812

(22) Filed: May 13, 2024

(65) Prior Publication Data

US 2024/0295845 A1 Sep. 5, 2024

Related U.S. Application Data

(60) Continuation of application No. 17/487,017, filed on Sep. 28, 2021, now Pat. No. 12,025,931, which is a (Continued)

(30) Foreign Application Priority Data

Oct. 23, 2018 (JP) ................................ 2018-199230

(51) Int. Cl.
*G03G 15/20* (2006.01)

(52) U.S. Cl.
CPC ..... *G03G 15/2053* (2013.01); *G03G 15/2064* (2013.01); *G03G 2215/00679* (2013.01); *G03G 2215/2038* (2013.01)

(58) Field of Classification Search
CPC ....................... G03G 15/2053; G03G 15/2064
(Continued)

(56) References Cited

U.S. PATENT DOCUMENTS 7,200,354 B2 4/2007 Nakamoto et al.
7,406,288 B2 7/2008 Nakamoto et al.
(Continued)

FOREIGN PATENT DOCUMENTS

JP 2004109878 A 4/2004
JP 2005265993 A 9/2005
(Continued)

OTHER PUBLICATIONS

Japanese Office Action issued Dec. 19, 2023 in corresponding Japanese Patent Appln. No. 2022-189178.
(Continued)

*Primary Examiner* — Quana Grainger
(74) *Attorney, Agent, or Firm* — Venable LLP

(57) ABSTRACT

A fixing unit includes an endless belt, a heating unit configured to heat the belt, a pressure rotary member configured to form a fixing nip portion that nips and conveys a recording material with the belt, a pad configured to press the belt toward the pressure rotary member, a sliding sheet provided on the pad and configured to slide against the belt, a plate-like member configured to fix the sliding sheet to the pad, the sliding sheet being fixed in a manner sandwiched between the plate-like member and the pad, and fixing tools configured to fix the plate-like member at a plurality of positions along a longitudinal direction of the plate-like member. A width of the sliding sheet is wider than a width of the fixing nip portion and narrower than a width of the plate-like member in the longitudinal direction.

15 Claims, 5 Drawing Sheets

Related U.S. Application Data division of application No. 16/600,849, filed on Oct. 14, 2019, now Pat. No. 11,163,250.

(58) Field of Classification Search
USPC ........................................................ 399/329
See application file for complete search history.

(56) References Cited

U.S. PATENT DOCUMENTS

| | | | |
|---|---|---|---|
| 7,457,576 | B2 | 11/2008 | Takada et al. |
| 7,844,208 | B2 | 11/2010 | Hayashi et al. |
| 8,219,015 | B2 | 7/2012 | Shinshi et al. |
| 9,915,900 | B1 | 3/2018 | Eiki et al. |
| 10,228,643 | B2 | 3/2019 | Nakamoto |
| 10,248,057 | B2 | 4/2019 | Uchida |
| 2006/0165446 | A1 | 7/2006 | Kikuchi |
| 2006/0182474 | A1 | 8/2006 | Naito et al. |
| 2009/0208263 | A1 | 8/2009 | Hanyu et al. |
| 2010/0290823 | A1 | 11/2010 | Okabe et al. |
| 2017/0160683 | A1 | 6/2017 | Gon |
| 2017/0261899 | A1 | 9/2017 | Gotoh et al. |
| 2017/0285539 | A1 | 10/2017 | Uchida |
| 2019/0187592 | A1 | 6/2019 | Takahashi |
| 2019/0278204 | A1 | 9/2019 | Nanjo |

FOREIGN PATENT DOCUMENTS

| | | | |
|---|---|---|---|
| JP | 2006201370 | A | 8/2006 |
| JP | 2008040420 | A | 2/2008 |
| JP | 2010181821 | A | 8/2010 |
| JP | 2010266802 | A | 11/2010 |
| JP | 2013214039 | A | 10/2013 |
| JP | 2014048624 | A | 3/2014 |
| JP | 2015031777 | A | 2/2015 |
| JP | 2017102329 | A | 6/2017 |
| JP | 2017125889 | A | 7/2017 |
| JP | 2017161706 | A | 9/2017 |
| JP | 2020067528 | A | 4/2020 |
| JP | 7187258 | B2 | 12/2022 |

OTHER PUBLICATIONS

Japanese Office Action issued Oct. 3, 2023 in corresponding Japanese Patent Appln. No. 2022-189178.
Japanese Office Action issued Aug. 23, 2022 in corresponding Japanese Patent Appln. No. 2018-199230.
Japanese Office Action dated Apr. 30, 2025 in counterpart Japanese Patent Appln. No. 2024-062114.

FIXING UNIT

CROSS-REFERENCE TO RELATED APPLICATIONS

This application is a Continuation of U.S. patent application Ser. No. 17/487,017, filed on Sep. 28, 2021, which is a Divisional of U.S. patent application Ser. No. 16/600,849, filed Oct. 14, 2019, which issued as U.S. Pat. No. 11,163,250 on Nov. 2, 2021, and which claims the benefit of Japanese Patent Application No. 2018-199230, filed Oct. 23, 2018, the entire disclosures of which are all hereby incorporated by reference herein.

BACKGROUND OF THE INVENTION

Field of the Invention

The present invention relates to a fixing unit preferably used in an image forming apparatus utilizing an electrophotography technique, such as a printer, a copying machine, a facsimile or a multifunction machine.

Description of the Related Art

An image forming apparatus is equipped with a fixing unit configured to apply heat and pressure to a recording material onto which an unfixed toner image is formed and to fix the toner image onto the recording material. Hitherto, a fixing unit including an endless fixing belt, a pressing member arranged on an inner side of the fixing belt, and a roller, i.e., pressure roller, being in contact with the fixing belt is used. In the fixing unit, the fixing belt is pressed toward the roller by the pressing member to form a fixing nip portion between the fixing belt and the roller, and the recording material is nipped and conveyed by the fixing nip portion while being heated and pressed. Thereby, a toner image is fixed to the recording material.

In the above-mentioned fixing unit, if there is much friction between the fixing belt and the pressing member, rotation of the fixing belt may be obstructed. Then, the toner image fixed to the recording material may be disturbed, or creases may be formed on the recording material. In order to prevent these drawbacks, a sliding sheet coating a lubricant is arranged between the fixing belt and the pressing member to reduce friction between the pressing member and the fixing belt (Japanese Patent Application Laid-Open Publication Nos. 2004-109878 and 2017-125889).

If the sliding sheet sliding against the fixing belt is curled up, rotation of the fixing belt may be obstructed by the curled sliding sheet rubbing against the fixing belt, or durability of the fixing belt or the sliding sheet may be deteriorated. In the case of the apparatus disclosed in the above-mentioned Japanese Patent Application Laid-Open Publication No. 2004-109878, the end portion of the sliding sheet, that is, the end portion in the longitudinal direction, the same applies hereafter unless denoted otherwise, is not fixed and constitutes a free end, so that there was a problem that the sliding sheet tended to curl up from the end portion side. Meanwhile, in the case of the apparatus disclosed in the above-mentioned Japanese Patent Application Laid-Open Publication No. 2017-125889, the sliding sheet including the end portion thereof is wound around the pressing member and fixed thereto by a screw-engaged fixing member. However, according to such configuration, it was not only difficult but also troublesome to wind the sliding sheet appropriately around the pressing member. Hitherto, in a configuration where the sliding sheet is arranged between the fixing belt and the pressing member, a fixing unit capable of suppressing the curling of the sliding sheet by a simple configuration has been awaited, but such configuration has not yet been proposed.

SUMMARY OF THE INVENTION

According to a first aspect of the present invention, a fixing unit configured to fix an unfixed toner image formed on a recording material to the recording material, the fixing unit comprising: an endless belt; a heating unit configured to heat the belt; a pressure rotary member configured to form a fixing nip portion that nips and conveys a recording material with the belt and to drive the belt to rotate; a pad configured to press the belt toward the pressure rotary member; a sliding sheet provided on the pad and configured to slide against the belt; a plate-like member configured to fix the sliding sheet to the pad, the sliding sheet being fixed in a manner sandwiched between the plate-like member and the pad; and fixing tools configured to fix the plate-like member at a plurality of positions along a longitudinal direction of the plate-like member, wherein a width of the sliding sheet is wider than a width of the fixing nip portion and narrower than a width of the plate-like member in the longitudinal direction.

According to a second aspect of the present invention, a fixing unit configured to fix an unfixed toner image formed on a recording material to the recording material, the fixing unit comprising: an endless belt; a heating unit configured to heat the belt; a pressure rotary member configured to form a fixing nip portion that nips and conveys a recording material with the belt and to drive the belt to rotate; a pad configured to press the belt toward the pressure rotary member; a sliding sheet provided on the pad and configured to slide against the belt; a plate-like member configured to fix the sliding sheet to the pad, the sliding sheet being fixed in a manner sandwiched between the plate-like member and the pad; and fixing tools configured to fix the plate-like member at a plurality of positions along a longitudinal direction of the plate-like member, wherein a width of the sliding sheet is wider than a width of the fixing nip portion and equal to or narrower than a width of the plate-like member in the longitudinal direction.

Further features of the present invention will become apparent from the following description of exemplary embodiments with reference to the attached drawings.

DESCRIPTION OF THE EMBODIMENTS

Image Forming Apparatus

Figure 1:
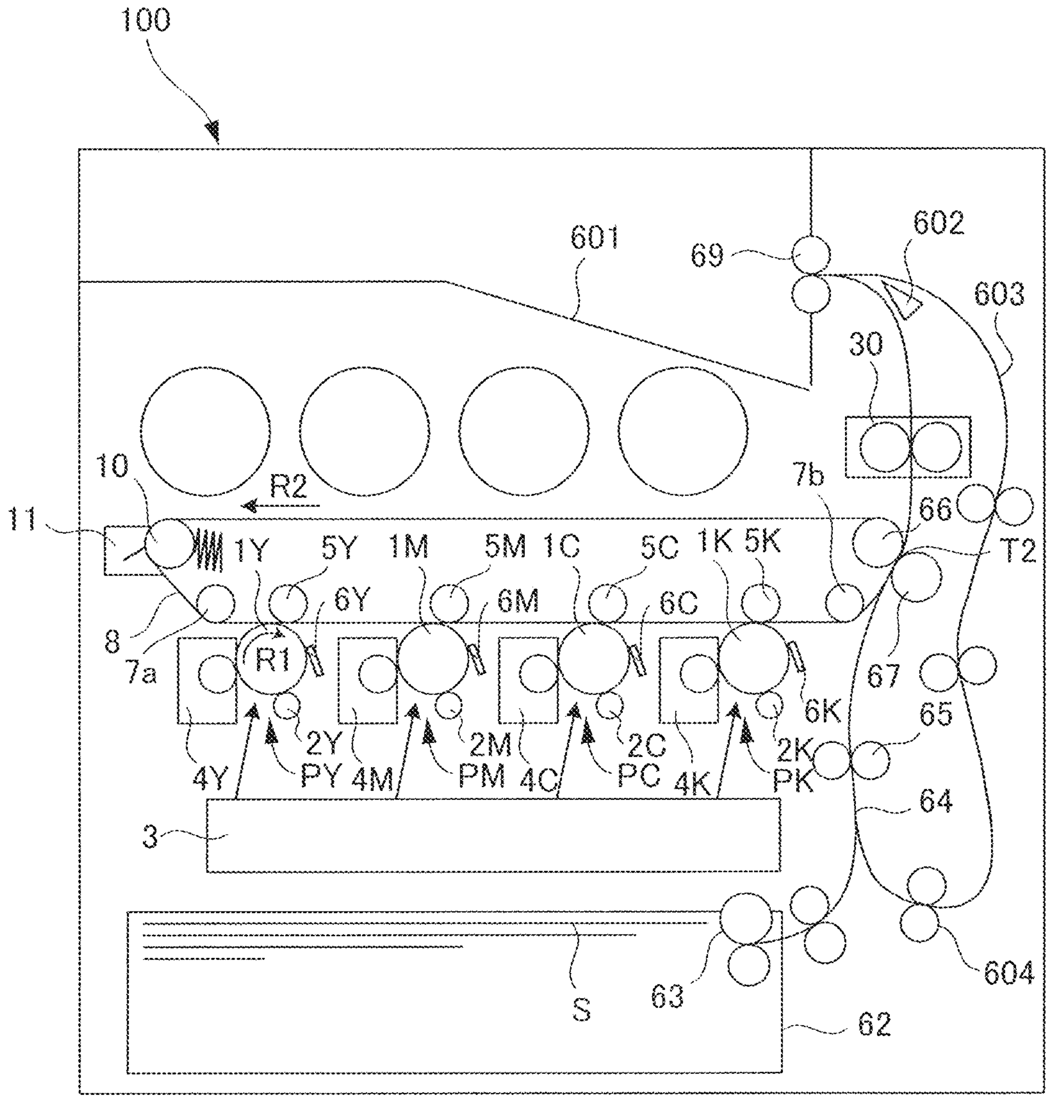
FIG. 1 is a schematic view illustrating a preferable image forming apparatus using a fixing unit according to a present embodiment.

Now, a fixing unit according to the present embodiment will be described. At first, an image forming apparatus suitable for applying the fixing unit according to the present embodiment will be described with reference to FIG. 1. An image forming apparatus 100 illustrated in FIG. 1 is an intermediate transfer tandem-type color image forming apparatus in which image forming units PY, PM, PC and PK corresponding to yellow, magenta, cyan and black colors are arranged along an intermediate transfer belt 8.

A conveyance process of a recording material of the image forming apparatus 100 will now be described. The recording materials S are stored in a manner placed in a cassette 62, and the recording materials S are fed one by one at a time by a sheet feed roller 63 to a sheet conveyance path 64. Further, the recording materials S supported on a manual feed tray not shown may be fed one by one at a time to the sheet conveyance path 64. In a state where the recording material S is conveyed to a registration roller 65 arranged in midway of the sheet conveyance path 64, the registration roller 65 performs skew control and timing control of the recording material S, before the recording material is sent to a secondary transfer portion T2. The secondary transfer portion T2 is a transfer nip portion formed by a secondary transfer inner roller 66 and a secondary transfer outer roller 67 which are opposed to one another. At the secondary transfer portion T2, secondary transfer voltage is applied to the secondary transfer inner roller 66, by which toner image is secondarily transferred from the intermediate transfer belt 8 to the recording material S.

A process for forming an image sent to the secondary transfer portion T2 at a similar timing as the conveyance process of the recording material S sent to the secondary transfer portion T2 described above will be described. At first, image forming units PY through PK will be described. The image forming units PY through PK have approximately similar configurations except for the difference in toner colors, which are yellow, magenta, cyan and black, used in the developing apparatuses 4Y, 4M, 4C and 4K. Therefore, the yellow image forming unit PY is described as a representative example in the following description, and the description of other image forming portions PM, PC and PK are omitted.

The image forming unit PY is mainly composed of a photosensitive drum 1Y, a charge unit 2Y, a developing apparatus 4Y and a photosensitive drum cleaner 6Y. A surface of the photosensitive drum 1Y being driven to rotate is charged uniformly in advance by the charge unit 2Y, and thereafter, an electrostatic latent image is formed by an exposing unit 3 being driven based on image information signals. Next, an electrostatic latent image formed on the photosensitive drum 1Y is visualized by toner image development by the developing apparatus 4Y. Thereafter, predetermined pressurizing force and primary transfer bias are applied by a primary transfer roller 5Y arranged opposed to the image forming unit PY with the intermediate transfer belt 8 interposed therebetween, and the toner image formed on the photosensitive drum 1Y is primarily transferred to the intermediate transfer belt 8. Transfer residual toner remaining slightly on the photosensitive drum 1Y after primary transfer is removed by the photosensitive drum cleaner 6Y, which is a cleaning blade, for example, and the image forming unit is prepared for a subsequent image forming process.

The intermediate transfer belt 8 is stretched across a tension roller 10, a secondary transfer inner roller 66 and driven rollers 7*a* and 7*b*, and it is driven to move in a direction of arrow R2 in the drawing. In the present embodiment, the secondary transfer inner roller 66 also functions as a drive roller that drives the intermediate transfer belt 8. The image forming processes of respective colors processed by the above-described image forming units PY through PK are performed at a timing at which the toner image is sequentially overlapped with the toner image formed through primary transfer on the intermediate transfer belt 8 at an upstream position in the direction of movement. As a result, finally, a full-color toner image is formed on the intermediate transfer belt 8 and conveyed to the secondary transfer portion T2. The transfer residual toner having passed through the secondary transfer portion T2 is removed from the intermediate transfer belt 8 by a transfer cleaner device 11.

By the conveyance process and image forming process described earlier, the timings at which the recording material S and the full-color toner image are conveyed to the secondary transfer portion T2 correspond, and the toner image is secondarily transferred from the intermediate transfer belt 8 to the recording material S. Thereafter, the recording material S is conveyed to a fixing unit 30, and by pressure and heat applied by the fixing unit 30, the toner image is melted and fixed to the recording material S. In the case of single-sided printing, the recording material S to which toner image has been fixed is discharged onto a sheet discharge tray 601 by a sheet discharge roller 69 rotated in normal rotation. Meanwhile, in the case of duplex printing, the recording material S is conveyed until a trailing edge of the recording material S passes a switching member 602 by the sheet discharge roller 69 rotated in normal rotation, and thereafter, a leading edge and a trailing edge of the recording material S are switched by the sheet discharge roller 69 switched and rotated in reverse rotation to be conveyed to a duplex conveyance path 603. Thereafter, the recording material S is conveyed again to the sheet conveyance path 64 by a sheet reconveyance roller 604. The conveyance process and image forming process performed to a second side of the recording material S are the same as the above-described processes, so descriptions thereof are omitted.

Fixing Unit

Figure 2:
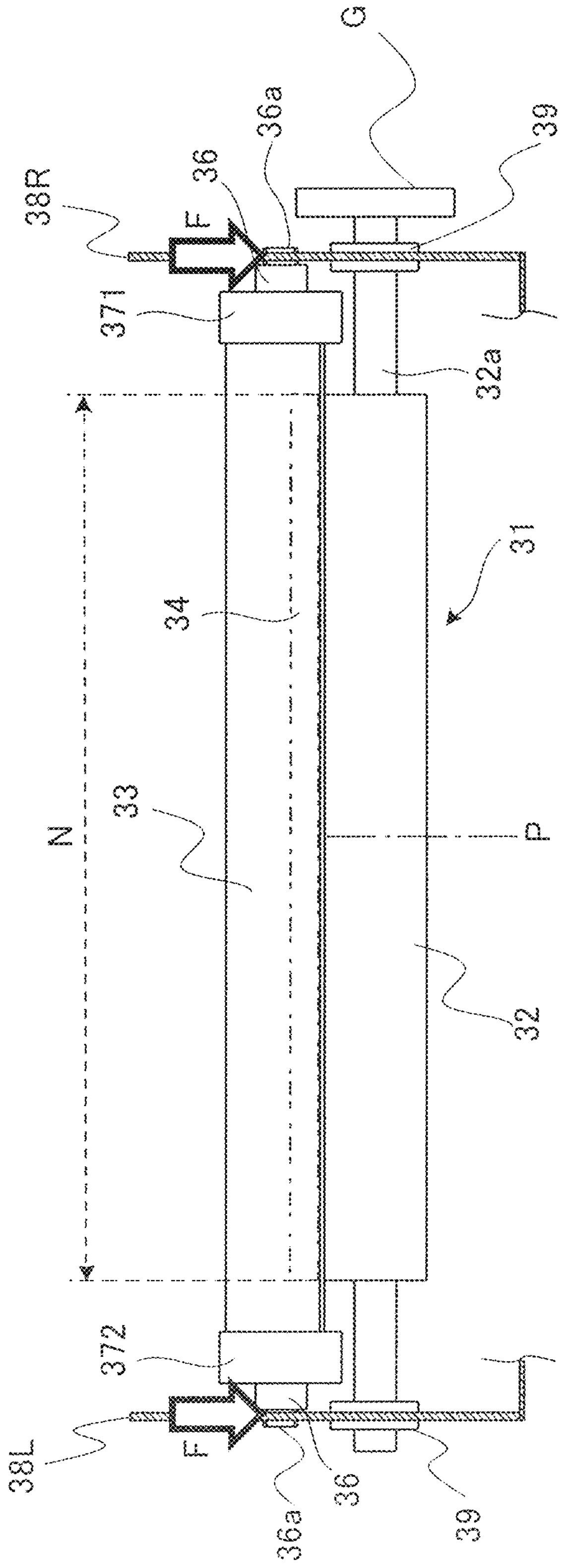
FIG. 2 is a schematic view illustrating the fixing unit.

Next, the fixing unit 30 according to the present embodiment will be described with reference to FIGS. 2 through 5. As illustrated in FIG. 2, the fixing unit 30 according to the present embodiment includes a fixing belt assembly 31 and a pressure roller 32. The pressure roller 32 serving as a pressure rotary member is provided rotatably on the apparatus body by a rotation shaft 32*a* thereof being borne on bearing members 39 respectively provided on a side panel 38L and a side panel 38R of the apparatus body. Further, the pressure roller 32 is arranged in parallel with the fixing belt assembly 31 to contact a fixing belt 33 of the fixing belt assembly 31 and to apply pressure to the fixing belt 33. The pressure roller 32 can be a roller in which an elastic layer such as silicon rubber is arranged on an outer peripheral surface of a rotation shaft 32*a* made of metal, i.e., core bar, or further having a fluororesin layer formed of PTFE, PFA, FEP and the like provided on an outer peripheral surface of the elastic layer.

Fixing Belt Assembly

Figure 3:
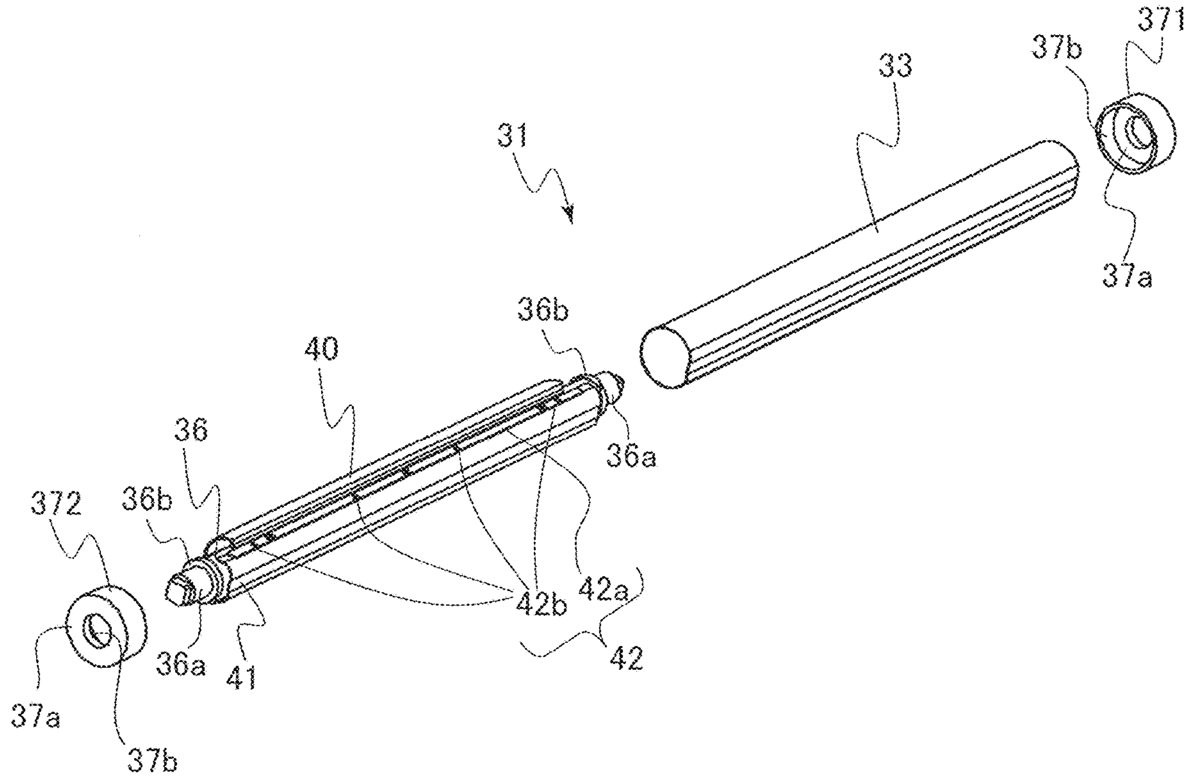
FIG. 3 is an exploded perspective view illustrating a fixing belt assembly.

The fixing belt assembly 31 is provided movably toward the pressure roller 32 side on the side panels 38L and 38R of the apparatus body. As illustrated in FIGS. 2 and 3, the fixing belt assembly 31 includes the fixing belt 33 having flexibility and formed in the shape of a cylinder having an endless shape, and a first end holder 371 and a second end holder 372 that retain the fixing belt 33 at both end portions in the longitudinal direction, that is, in the direction of the rotation axis of the fixing belt 33. A belt having a conductive layer with high thermal conductivity and low heat capacity, such as a resin belt, or a belt having a composite layered structure including a base layer formed of a metal belt and an elastic layer and a release layer and the like formed on an outer peripheral surface thereof can be used as the fixing belt 33. The fixing belt 33 according to the present embodiment includes a thin belt in the form of a film.

According to the present embodiment, the first and second end holders 371, and 372 each of which has a cylindrical shape are fit from the outside to end portions of the fixing belt 33, respectively. If the fixing belt 33 is moved in a biased manner to the longitudinal direction, one of the first end holder 371 serving as a first regulation member and the second end holder 372 serving as a second regulation member receives the longitudinal end portion of the fixing belt 33 and regulates movement of the fixing belt 33 in the longitudinal direction. In other words, in a state where the fixing belt 33 is rotated by the pressure roller 32 and moves toward a first side in the longitudinal direction, a first edge of the fixing belt 33 in the longitudinal direction abuts against the first end holder 371, by which further biasing movement toward the first side is regulated. Also, in a state where the fixing belt 33 is rotated by the pressure roller 32 and moves toward a second side opposite to the first side in the longitudinal direction, a second edge of the fixing belt 33 in the longitudinal direction abuts against the second end holder 372, by which further biasing movement toward the second side is regulated. That is, due to attachment errors and the like of the pressure roller 32 and the fixing belt assembly 31, the pressure roller 32 and the fixing belt 33 may be arranged in a state slightly displaced from a parallel arrangement. In that case, the fixing belt 33 being rotated by the rotating pressure roller 32 may be moved in a biased manner in the longitudinal direction. Therefore, the first and second end holders 371, and 372 are fit from the outside to the fixing belt 33 so as to suppress biasing movement of the fixing belt 33 by the pressure roller 32.

As illustrated in FIG. 3, the longitudinal positions of the first and second end holders 371, and 372 are regulated by planar portions 37*a* of the first and second end holders 371, and 372 being abutted against annular projection 36*b* formed on a stay 36, respectively. The first and second end holders 371, and 372 are provided so as not to move in the longitudinal direction even if they are abutted against the fixing belt 33 at those positions. That is, the planar portion 37*a* of the first end holder 371 serves as a first abutment portion that abuts against the first edge and regulates the fixing belt 33 from moving in the longitudinal direction of the fixing belt 33 (in further detail, a fixing nip portion described in detail later) and the planar portion 37*a* of the second end holder 372 serves as a second abutment portion that abuts against the second edge and regulates the fixing belt 33 from moving in the longitudinal direction of the fixing belt 33.

In the case of the present embodiment, the first and second end holders 371, and 372 are disposed to regulate movement of the fixing belt 33 in the longitudinal direction, and to co-rotate with the fixing belt 33. In order to enable co-rotation with the fixing belt 33, the first and second end holders 371, and 372 are provided with fitting portions 37*b* that fit to the fixing belt 33, the fitting portions 37*b* formed to protrude from the planar portions 37*a* toward a center of the fixing belt 33 in the longitudinal direction, respectively. Each fitting portion 37*b* is formed along the whole outer peripheral edge of the planar portion 37*a* having a circular shape to cover the outer surface of the fixing belt 33. By composing the first and second end holders 371, and 372 to co-rotate with the fixing belt 33, friction caused by the fixing belt 33 sliding against the end holders 37 will not be generated easily. The first end holder 371 can be used as a detection target portion for detecting the rotational speed of the fixing belt 33. For example, it is preferable to adopt a configuration where the rotational speed of the first end holder 371 is detected using an optical sensor (not shown) and the like, and to assume the rotational speed of the first end holder 371 is detected as the rotational speed of the fixing belt 33. As described above, in the present embodiment, the first end holder 371 includes the fitting portion 37*b* serving as a first cylindrical peripheral portion arranged at a first end portion, on the first side in the longitudinal direction, of the fixing belt 33 and configured to cover a surface of the fixing belt 33, and the planar portion 37*a* configured to abut against the first edge of the fixing belt 33 in the longitudinal direction. The second end holder 372 includes the fitting portion 37*b* serving as a second cylindrical peripheral portion arranged at a second end portion, on a second side opposite to the first side in the longitudinal direction, of the fixing belt 33 and configured to cover a surface of the fixing belt 33, and the planar portion 37*a* configured to abut against the second edge of the fixing belt 33 in the longitudinal direction.

In the present embodiment, the stay 36, in further detail, an arm portion 36*a*, is urged by an urging mechanism such as a spring (not shown) toward the pressure roller 32 by predetermined urging force F. Thereby, the fixing belt 33 and the pressure roller 32 are mutually in pressure contact with one another with desire pressure contact force. By arranging the fixing belt 33 and the pressure roller 32 to be in pressure contact with one another, a fixing nip portion N is formed between the fixing belt 33 and the pressure roller 32, allowing the recording material S to pass through while applying pressure thereto and fixing the toner image to the recording material S by heat. Further, according to the present embodiment, the fixing nip portion N can be formed further reliably by pressing the fixing belt 33 from an inner side toward the pressure roller 32 by a pad 34 (refer to FIG. 4) supported on the stay 36. The urging mechanism (not shown) that urges the stay 36 may have a release function to release the urging force applied toward the pressure roller 32, and may be configured to enable removal of the recording material S remaining in a nipped manner in the fixing nip portion N by the user cancelling the urging force during processing of jammed sheets.

As illustrated in FIG. 2, a drive gear G is provided on the rotation shaft 32*a* of the pressure roller 32. The pressure roller 32 rotates by turning force of a motor (refer to FIG. 4: M1) being transmitted via a power transmission mechanism (not shown) to the drive gear G. Since the fixing nip portion N is formed between the fixing belt 33 and the pressure roller 32, the turning force of the pressure roller 32 is transmitted to the fixing belt 33 by frictional force generated at the fixing nip portion N. Thereby, the fixing belt 33 is driven to rotate by the pressure roller 32, the mechanism referred to as pressure roller drive system. The recording material S is nipped between and conveyed by the rotating pressure roller 32 and fixing belt 33. In the case of the present embodiment, regardless of the length of the recording material S in the width direction, that is, longitudinal direction of the fixing belt 33, any recording material S determined usable can be conveyed by center-referenced conveyance in which a center portion of the recording material S in the width direction passes a center sheet-feed reference line P (virtual line) of the fixing belt 33. The fixing belt assembly 31 is formed approximately symmetrically in the longitudinal direction with respect to the center sheet-feed reference line P.

Figure 4:
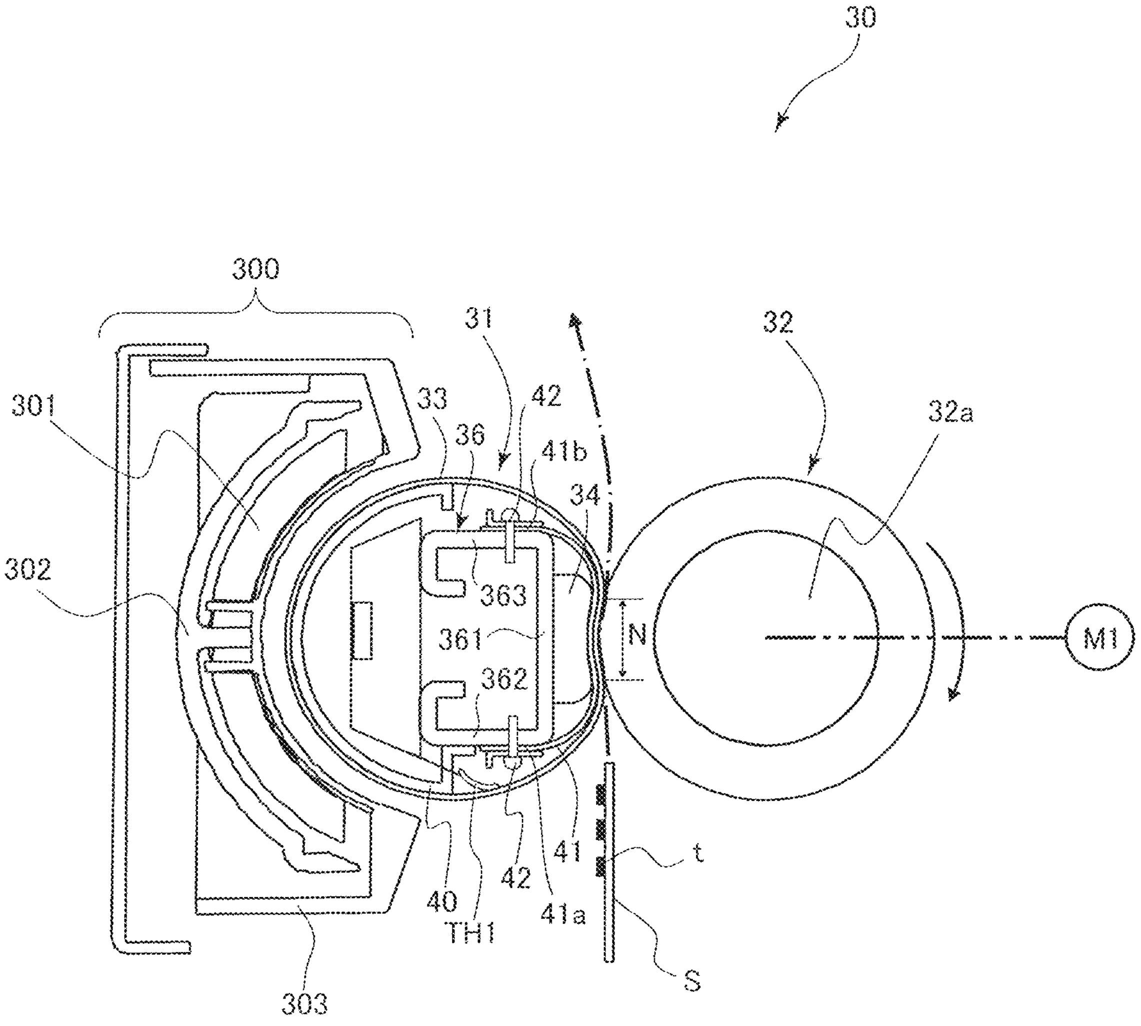
FIG. 4 is a cross-sectional view illustrating a fixing belt assembly.

As shown in FIG. 4, the fixing belt assembly 31 includes, on an inner side of the endless fixing belt 33, the pad 34, the stay 36, a belt guide 40, a sliding sheet 41 and a fixing mechanism 42. The fixing belt 33 is fit from the outside rotatably to the belt guide 40 having heat resistance and stiffness. The belt guide 40 is a plate-like member that extends in the longitudinal direction of the fixing belt 33, and it is formed in a circular arc shape so that its outer peripheral surface serves as a sliding surface that slides against the fixing belt 33. In other words, an outer peripheral surface of the belt guide 40 contacts an inner circumferential surface of the fixing belt 33, and the belt guide 40 is enabled to slide against the fixing belt 33. The belt guide 40 is formed, for example, by press-forming a metal plate such as an aluminum plate, and functions together with the pad 34 described later as a rotation guide of the fixing belt 33.

The belt guide 40 described above is fixed to the stay 36. The stay 36 is a stiffness member that extends in the longitudinal direction along the fixing belt 33. The arm portion 36*a* is formed on either end of the stay 36, and the first and second end holders 371,372 are rotatably attached to the arm portions 36*a,* respectively (refer to FIG. 3).

The stay 36 includes a main body 361, and an upstream-side fixing portion 362 and a downstream-side fixing portion 363 which erect from the main body 361 toward an opposite side from the pressure roller 32, wherein a transverse cross-section is formed in an approximately U-shape so that it has an opening toward the belt guide 40 side. The main body 361 is provided on an opposite side from the opening of the stay 36, that is, on the pressure roller 32 side, and supports the pad 34. The pad 34 is, for example, a molded product formed of heat-resistant resin extending in the longitudinal direction, and it is pressed by the fixing belt 33 with the sliding sheet 41 interposed therebetween. Thereby, the fixing belt 33 is capable of rotating while having the inner circumferential surface of the fixing belt 33 slide against the sliding sheet 41 at the fixing nip portion N side and slide against the belt guide 40 at the opening side of the stay 36. In the present embodiment, a longitudinal direction width, that is, longitudinal direction length, of the pad 34 is substantially the same as a longitudinal direction width of the body of the pressure roller 32 excluding the rotation shaft 32*a* (refer to FIG. 2). Further, the longitudinal direction width of the pad 34 is narrower than the longitudinal direction width of the fixing belt 33.

The sliding sheet 41 is, for example, a sheet member having a thickness of 40 μm or more and 300 μm or less using string-like fiber members formed of glass, resin and the like as warp and weft. It is preferable to use fiber members themselves coated with low friction resin, for example, fluorine-based resin such as PTFE or PFA, or fiber members themselves formed by low friction resin, as the sliding sheet 41, so as to improve the sliding performance of the surface.

Temperature Sensor and Induction Heating Apparatus

The fixing unit 30 further includes a temperature sensor TH1 for detecting the temperature of the fixing belt 33 and an induction heating apparatus 300 for inductively heating the fixing belt 33. The temperature sensor TH1 is a thermistor, for example, being arranged near a center portion of the fixing belt 33 in the longitudinal direction, to contact the inner circumferential surface of the fixing belt 33. Detection temperature of the temperature sensor TH1 is transmitted to a control unit (not shown) including a CPU (Central Processing Unit), a ROM (Read Only Memory), a RAM (Random Access Memory) and so on. The control unit controls the induction heating apparatus 300 based on the detection temperature of the temperature sensor TH1 so that the temperature of the fixing belt 33 is maintained at a target temperature (180° C., for example).

The induction heating apparatus 300 serving as a heating unit is arranged with a predetermined gap formed between the outer peripheral surface of the fixing belt 33 with respect to the fixing belt assembly 31 on the side of the belt guide 40 so that it does not contact the fixing belt 33. The induction heating apparatus 300 includes an exciting coil 301, an outer magnetic body core 302 and a coil retaining member 303. The exciting coil 301 is a coil that extends in the longitudinal direction and having a wire such as litz wire wound therearound, which is formed in a curved shape along the outer peripheral surface of the fixing belt 33. An alternating current having a frequency of “20 to 60 kHz”, for example, is supplied to the exciting coil 301 from a power supply unit such as an excitation circuit not shown. The frequency of the alternating current is changed by the control unit. AC magnetic field, i.e., magnetic flux, is generated by the alternating current to the exciting coil 301. When AC magnetic field is generated by the exciting coil 301, eddy current is generated in the conductive layer and the fixing belt 33 generates heat. In order to perform efficient inductive heating of the fixing belt 33, the outer magnetic body core 302 is formed of a member having high permeability, such as ferrite, capable of shielding AC magnetic field. Further, the outer magnetic body core 302 is arranged to cover the exciting coil 301 and suppress leakage of the AC magnetic field. The above-mentioned exciting coil 301 and the outer magnetic body core 302 are supported by the coil retaining member 303 formed of electrically insulating resin.

According to the fixing unit 30, in a state where the temperature of the fixing belt 33 is maintained at a desirable target temperature, the recording materials to which unfixed toner image t is formed is conveyed to the fixing nip portion N. The recording material S is conveyed in such a manner that a side of the recording material S on which the unfixed toner image t has been formed faces the fixing belt 33. The recording material S passes the fixing nip portion N while being nipped between and conveyed by the fixing belt 33 and the pressure roller 32 which are respectively rotated. Then, in a state where pressure is applied to the recording material S by the fixing belt 33 and the pressure roller 32, the recording material S is heated by the fixing belt 33, and the toner image t is fixed to the recording material S.

The above-described sliding sheet 41 remains between the pressing surface of the pad 34 and the fixing belt 33 and slides along the fixing belt 33, so that frictional force generated with the fixing belt 33 may be reduced compared to a case where the pad 34 and the fixing belt 33 move in sliding movement along each other directly. However, since frictional force inevitably occurs between the sliding sheet 41 and the fixing belt 33 by the pressure applied by the pad 34, the sliding sheet 41 may be pulled toward the direction of rotation of the fixing belt 33 by this frictional force. Now, in the area of the fixing nip portion N, the fixing belt 33 and the sliding sheet 41 are nipped relatively strongly by the pad 34 and the pressure roller 32, so that the fixing belt 33 and the sliding sheet 41 are maintained in a closely attached state along the contour of the pad 34. Therefore, curling of the sliding sheet 41 will not occur easily in the area of the fixing nip portion N.

In contrast, in the area outside the fixing nip portion N, the fixing belt 33 and the sliding sheet 41 are not sandwiched between the pad 34 and the pressure roller 32, so that the sliding sheet 41 tends to be pulled greatly at the end portion in the longitudinal direction most separated from the fixing nip portion N. Especially in a case where the end portion of the sliding sheet 41 is not fixed and forms a free end, the end portion side of the sliding sheet 41 may be pulled and deformed compared to the fixing nip portion N, so that the behavior of the sliding sheet 41 becomes unstable, and curling tends to occur at the end portion side of the sliding sheet 41. This is because tension, i.e., tensile force, of the sliding sheet 41 cannot be maintained uniformly, and the balance between the tension and the frictional force generated by sliding movement along the fixing belt 33 is deteriorated.

If the first and second end holders 371 and 372 are fit from the outside to the fixing belt 33, the end portion side of the sliding sheet 41 tends to be curled more easily. That is, in the case where the first and second end holders 371 and 372 are fit from the outside to the fixing belt 33, the fixing belt 33 is deformed in such a manner as to be narrowed in an inner diameter direction by the first and second end holders 371 and 372. In this case, the sliding sheet 41 receiving pressure from the fixing belt 33 narrowed toward the inner diameter direction is also pressed toward the inner diameter direction, so that curling may easily occur at the end portion side of the sliding sheet 41, depending on the shape of the fixing belt 33 or the sliding sheet 41, or dispersion of rotational behavior, such as eccentricity. If curling occurs to the sliding sheet 41, partial contact may increase frictional force and disturb movement of the fixing belt 33, or the sliding sheet 41 being curled up may be rolled into the fixing nip portion N, by which the durability of the sliding sheet 41 and the fixing belt 33 may be deteriorated.

Figure 5:
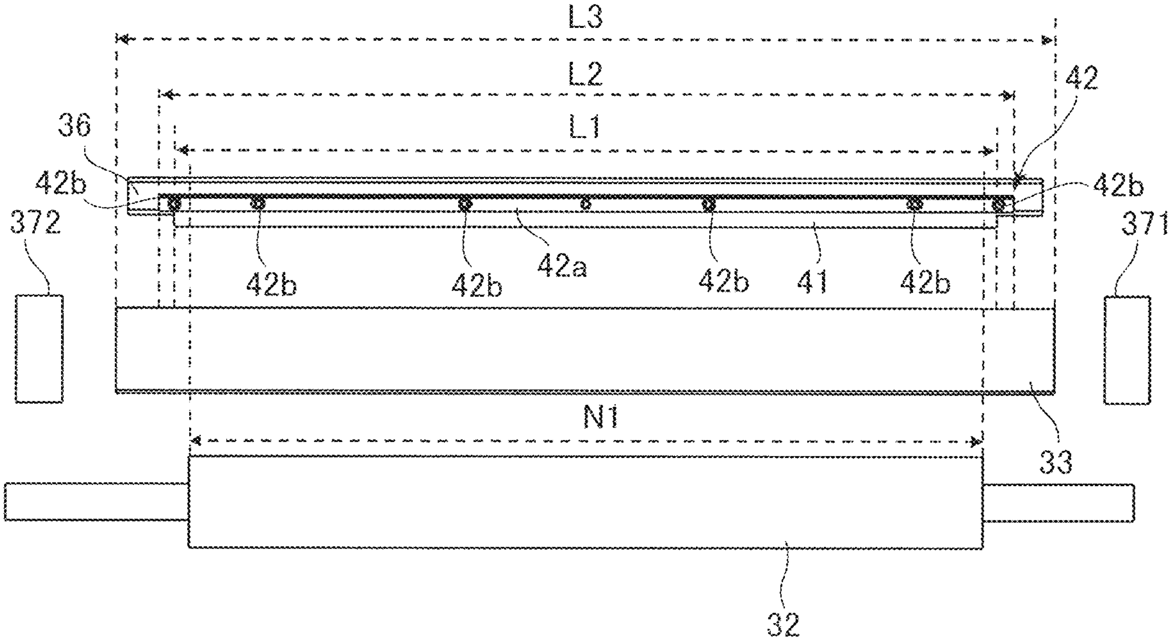
FIG. 5 is an exploded view illustrating a fixing mechanism.

According to the present embodiment, in view of the above-described points, the sliding sheet 41 is fixed to the stay 36 so that the tension of the sliding sheet 41 is maintained uniformly in the direction of rotation of the fixing belt 33 throughout the whole length in the longitudinal direction. Further, in addition thereto, the sliding sheet 41 is attached so that both end portions thereof are nipped between the stay 36 by the fixing mechanism 42. Now, the way in which the sliding sheet 41 according to the present embodiment is fixed to the stay 36 will be described with reference to FIGS. 4 and 5. In FIG. 5, a longitudinal width of the sliding sheet 41 is denoted by "L1", a longitudinal width of the fixing mechanism 42, in further detail, a plate-like member 42*a* described later, is denoted by "L2", and a longitudinal width of the fixing belt 33 is denoted by "L3". According to the present embodiment, the longitudinal widths of the sliding sheet 41, the fixing mechanism 42, in further detail, the plate-like member 42*a,* and the fixing belt 33 are respectively formed wider than a longitudinal width (N1) of the fixing nip portion N (N1<L1<L2<L3), and it is relatively arranged to include the fixing nip portion Nin the longitudinal direction. The longitudinal width (L1) of the sliding sheet 41 is formed wider than the longitudinal width (N1) of the fixing nip portion N and narrower than the longitudinal width (L2) of the plate-like member 42*a* described later. The longitudinal width (L1) of the sliding sheet 41 and the longitudinal width (L2) of the plate-like member 42*a* may be equal (L1=L2).

As illustrated in FIG. 4, the sliding sheet 41 is retained by the stay 36. Specifically, with respect to the direction of rotation of the fixing belt 33, the sliding sheet 41 is fixed to the upstream-side fixing portion 362 of the stay 36 at an upstream end portion 41*a* by the fixing mechanism 42, and is fixed to the downstream-side fixing portion 363 of the stay 36 at a downstream end portion 41*b* of the fixing mechanism 42. Thus, by fixing the upstream end portion 41*a* and the downstream end portion 41*b* of the sliding sheet 41 to the stay 36 by the fixing mechanism 42, the sliding sheet 41 can be fixed with a tension that is uniform in the direction of rotation of the fixing belt 33 by a simple configuration.

Since the sliding sheet 41 having low stiffness can easily move in the longitudinal direction by the frictional force generated with the fixing belt 33 and cause to be misregistered, the sliding sheet 41 is fixed to the stay 36 by the fixing mechanism 42. As illustrated in FIG. 5, the fixing mechanism 42 includes a plate-like member 42*a* having a long shape that extends in the longitudinal direction, and screws 42*b* serving as fixing tools. The sliding sheet 41 is arranged between the plate-like member 42*a* and the stay 36, and by attaching the plate-like member 42*a* to the stay 36 by screws 42*b,* the sliding sheet 41 can be interposed between the plate-like member 42*a* and the stay 36 and fixed thereto. According to the present embodiment, the plate-like member 42*a* formed of metal, i.e., sheet metal, is attached at multiple locations in the longitudinal direction by multiple screws 42*b* to the stay 36. Further, an end portion of the plate-like member 42*a* on the first side is arranged further on a center side than the first end holder 371 and arranged further on the first side than the fixing nip portion N in the longitudinal direction. And an end portion of the plate-like member 42*a* on the second side is arranged further on a center side than the second end holder 372 and arranged further on the second side than the fixing nip portion N in the longitudinal direction.

According to the present embodiment, as illustrated in FIG. 5, the sliding sheet 41 is mounted to the stay 36 by the fixing mechanism 42. That is, the plate-like member 42*a* of the fixing mechanism 42 is arranged so that the sliding sheet 41 is interposed between the stay 36 and the plate-like member 42*a* throughout the whole length of the sliding sheet 41 including both end portions thereof. As described above, the plate-like member 42*a* is formed so that the longitudinal width (L2) thereof is longer than the longitudinal width (L1) of the sliding sheet 41 and shorter than the longitudinal width (L3) of the fixing belt 33. By attaching such plate-like member 42*a* to the stay 36 so that either end of the plate-like member 42*a* is positioned between the end portion of the sliding sheet 41 and the end portion of the fixing belt 33, both end portions of the sliding sheet 41 are respectively interposed between the stay 36 and the plate-like member 42*a.* In the present embodiment, the screw 42*b* arranged furthest on the first side among the screws 42*b* is arranged further on the first side than the fixing nip portion N in the longitudinal direction, and the screw 42*b* arranged furthest on the second side among the screws 42*b* is arranged further on the second side than the fixing nip portion N in the longitudinal direction. The first and second end holders 371,372 are arranged so that they are not overlapped with the sliding sheet 41. Further, the first and second end holders 371,372 are arranged so that they are not overlapped with the plate-like member 42*a.*

As described, according to the present embodiment, the tension of the sliding sheet 41 can be maintained uniformly throughout the whole length thereof including both end portions in the longitudinal direction, without being affected by the rotation of the fixing belt 33. In other words, by fixing the upstream end portion 41*a* and the downstream end portion 41*b* of the sliding sheet 41 to the stay 36, the sliding sheet 41 can be pulled uniformly throughout the whole length by frictional force generated with the fixing belt 33, and a difference in tension does not easily occur between the area within the fixing nip portion N and the area outside the fixing nip portion N. Further, by fixing the sliding sheet 41 including both end portions thereof to the stay 36, the tension of the sliding sheet 41 can easily be maintained uniformly in the longitudinal direction. Thus, behavior of the sliding sheet 41 is stabilized and curling of the sliding sheet 41 is suppressed. Even if the first and second end holders 371,372 are fit from the outside to the fixing belt 33, curling of the sliding sheet 41 from the end portion side can be suppressed. Moreover, the sliding sheet 41 can be attached appropriately to the pad 34 by attaching the sliding sheet 41 to the stay 36, so that this configuration is advantageous.

The fixing mechanism 42 can be composed of only the screws 42*b*, and in that case, the sliding sheet 41 is interposed between the screws 42*b* and the stay 36 and fixed thereto. The plate-like member 42*a* can be configured of a plurality of parts that are arranged intermittently, and in the present specification, such configuration is also included in the plate-like member 42*a* having a long shape. The sliding sheet 41 should be fixed in a manner where at least both end portions of the sliding sheet 41 in the longitudinal direction are interposed between the stay 36 and the fixing mechanism 42.

In the above-described embodiment, the sliding sheet 41 is fixed to the upstream-side fixing portion 362 and the downstream-side fixing portion 363 in the stay 36, but the present invention is not limited thereto, and as long as the tension of the sliding sheet 41 can be maintained uniformly, the sliding sheet 41 can be fixed to the main body 361, for example. However, in order to realize pressure-contact of the fixing belt 33 and the pressure roller 32 with desirable pressure contact force, from the viewpoint of adjustment of surface pressure of the pad 34 by the urging mechanism (not shown), it is preferable to fix the sliding sheet 41 to the upstream-side fixing portion 362 and the downstream-side fixing portion 363 than to fix the sliding sheet 41 to the main body 361. Further, the sliding sheet 41 can be attached to the stay 36 easily if the sliding sheet 41 is fixed to the upstream-side fixing portion 362 and the downstream-side fixing portion 363. In order to do so, it is preferable for the upstream-side fixing portion 362 and the downstream-side fixing portion 363 of the stay 36 to be arranged separately at a distance so that an interval wider than the fixing nip portion N is formed in a direction intersecting the longitudinal direction (refer to FIG. 4).

In the above-described embodiment, the induction heating apparatus 300 adopting an inductive heating method for heating the fixing belt 33 is used, but the present invention is not limited thereto. For example, a configuration can be adopted where a heat source such as a halogen heater, a ceramic heater or an infrared lamp is provided on an inner side or an outer side of the fixing belt 33 to heat the fixing bet 33. In another example, a heat source for heating the pressure roller 32 instead of heating the fixing belt 33 can be provided.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-199230, filed on Oct. 23, 2018, which is hereby incorporated by reference herein in its entirety.

What is claimed is:

1. A fixing unit configured to fix an unfixed toner image formed on a recording material to the recording material, the fixing unit comprising:

an endless belt;

a heating unit configured to heat the belt;

a pressure rotary member configured to form a fixing nip portion that nips and conveys a recording material with the belt and to drive the belt to rotate;

a pad configured to press the belt toward the pressure rotary member;

a sliding sheet provided on the inner side of the belt and configured to slide against the belt by being pressed by the pad, the sliding sheet including a first surface that is a surface of the sliding sheet on one side in a thickness direction and a second surface that is a surface of the sliding sheet on the other side in the thickness direction, opposite to the first surface and comes into contact with the belt; and a contact member made of metal, and configured to come into contact with the second surface of the sliding sheet, wherein the sliding sheet is arranged so that it does not extend beyond the contact member in the longitudinal direction of the belt, and the sliding sheet is shorter than the contact member in the longitudinal direction.

2. The fixing unit according to claim 1, wherein a widthwise length of the sliding sheet is equal to or larger than a widthwise length of the fixing nip portion in the longitudinal direction.

3. The fixing unit according to claim 2, further comprising:

a first regulation member comprising a first cylindrical peripheral portion arranged at a first end portion, on a first side in the longitudinal direction, of the belt and configured to cover an outer surface of the belt, and a first abutment portion configured to abut against a first edge of the belt in the longitudinal direction; and a second regulation member comprising a second cylindrical peripheral portion arranged at a second end portion, on a second side opposite to the first side in the longitudinal direction, of the belt and configured to cover the outer surface of the belt, and a second abutment portion configured to abut against a second edge of the belt in the longitudinal direction, wherein the first and second regulation members regulate movement of the belt in the longitudinal direction.

4. The fixing unit according to claim 2, wherein a widthwise length of the pad is smaller than a widthwise length of the belt in the longitudinal direction.

5. The fixing unit according to claim 3, wherein the first and second regulation members rotate together with the belt.

6. The fixing unit according to claim 1, wherein the heating unit is a heater provided on an outside of the belt so as not to contact the belt.

7. The fixing unit according to claim 1, wherein the heating unit comprises a coil, and wherein the belt comprises a conductive layer, and is configured to generate heat by eddy current generated in the conductive layer by having current supplied to the coil.

8. The fixing unit according to claim 1, wherein the contact member is configured to position the sliding sheet in the longitudinal direction.

9. A fixing unit configured to fix an unfixed toner image formed on a recording material to the recording material, the fixing unit comprising:

an endless belt;

a heating unit configured to heat the belt;

a pressure rotary member configured to form a fixing nip portion that nips and conveys a recording material with the belt and to drive the belt to rotate;

a pad configured to press the belt toward the pressure rotary member;

a sliding sheet provided on the inner side of the belt and configured to slide against the belt by being pressed by the pad, the sliding sheet including a first surface that is a surface of the sliding sheet on one side in a thickness direction and a second surface that is a surface of the sliding sheet on the other side in the thickness direction, opposite to the first surface and comes into contact with the belt; and a contact member configured to come into contact with the second surface of the sliding sheet and to apply pressure against the sliding sheet in the thickness direction of the sliding sheet to position the sliding sheet, wherein the sliding sheet is arranged so that it does not extend beyond the contact member in a longitudinal direction of the belt, and the sliding sheet is shorter than the contact member in the longitudinal direction.

10. The fixing unit according to claim 9, wherein the contact member is configured to position the sliding sheet in the longitudinal direction.

11. The fixing unit according to claim 9, wherein a widthwise length of the sliding sheet is equal to or larger than a widthwise length of the fixing nip portion.

12. The fixing unit according to claim 9, wherein a widthwise length of the pad is smaller than a widthwise length of the belt.

13. The fixing unit according to claim 9, wherein the heating unit is a heater provided on an outside of the belt so as not to contact the belt.

14. The fixing unit according to claim 9, wherein the heating unit includes a coil, and wherein the belt includes a conductive layer, and is configured to generate heat by eddy current generated in the conductive layer by having current supplied to the coil.

15. The fixing unit according to claim 9, wherein the contact member is a metal member.

* * * * *